United States Patent

[11] 3,584,812

| [72] | Inventors | Maurice Joseph Brenman Bramhall;<br>Alfred Holt, Alkrington, Manchester, both of, England |
|---|---|---|
| [21] | Appl. No. | 783,160 |
| [22] | Filed | Nov. 4, 1968 |
| [45] | Patented | June 15, 1971 |
| [73] | Assignee | Hawker Siddeley Aviation Limited<br>Kingston-upon-Thames, Surrey, England |
| [32] | Priority | Nov. 6, 1967 |
| [33] | | Great Britain |
| [31] | | 50387/67 |

[54] AIRCRAFT LIFTING SURFACES
5 Claims, 2 Drawing Figs.

[52] U.S. Cl. ..................................................... 244/41,
                                                              244/130
[51] Int. Cl. ....................................................... B64c 21/06
[50] Field of Search........................................... 244/40, 41,
                                               130, 123; 260/94.9 G7

[56] References Cited
UNITED STATES PATENTS

| 2,643,832 | 6/1953 | Thwaites | 244/40 |
| 2,742,247 | 4/1956 | Lachmann | 244/130 |
| 2,833,492 | 5/1958 | Fowler | 244/40 |
| 3,128,973 | 4/1964 | Dannenberg | 244/130 |
| 3,261,576 | 7/1966 | Valyi | 244/130 |

Primary Examiner—Milton Buchler
Assistant Examiner—Jeffrey L. Forman
Attorney—Dowell & Dowell ABSTRACT: An aircraft wing surface structure, adapted for laminar flow control, wherein the normal wing surface has placed externally upon it a lattice of ribs covered by an outer elastic porous sheet, the spaces between the ribs constituting channels to which suction is applied so as to draw air in through the porous sheet. A supporting layer of impervious material, with perforations, is interposed between the porous sheet and the lattice. To prevent the pores of the outer sheet from becoming clogged air can be alternately sucked in and blown out through it.

PATENTED JUN 15 1971

3,584,812

Inventors:-
Maurice Joseph Brennan
Alfred Holt
By
Dowell & Dowell
Attorneys

AIRCRAFT LIFTING SURFACES

This invention relates to aircraft lifting surfaces. More particularly, it is concerned with surfaces adapted for laminar flow control by suction through the surface area.

One of the problems of obtaining a wing or other lifting surface structure with the desired laminar flow control characteristic lies in the fact that it is difficult to obtain a good even distribution of suction over the surface area because of the presence within the wing of essential structural members. Previous solutions have involved cutting or slotting the structural members for air passage. It is therefore an object of the invention to achieve even suction without interference with the basic structure of the wing.

According to one aspect of the invention, a wing, or other lifting surface, is adapted for laminar flow control by placing externally on the wing surface an open support framework, lattice or honeycomb and then covering the lattice or honeycomb with a highly elastic porous sheet. It is then possible to suck air through the porous sheet into the region occupied by the lattice or honeycomb without breaching the actual wing structure.

There remains the difficulty that a porous sheet is likely to become clogged by atmospheric pollution. According to another aspect of the invention, a wing, or other lifting surface, has an external surface comprising a porous sheet and means are provided for alternately sucking and blowing air through the porous sheet. The sucking and blowing technique keeps the pores of the sheet clear, and blowing itself gives a form of boundary layer control.

One practical way of carrying the invention into effect will now be described by way of example and with reference to the accompanying drawings in which.

Figure 1:
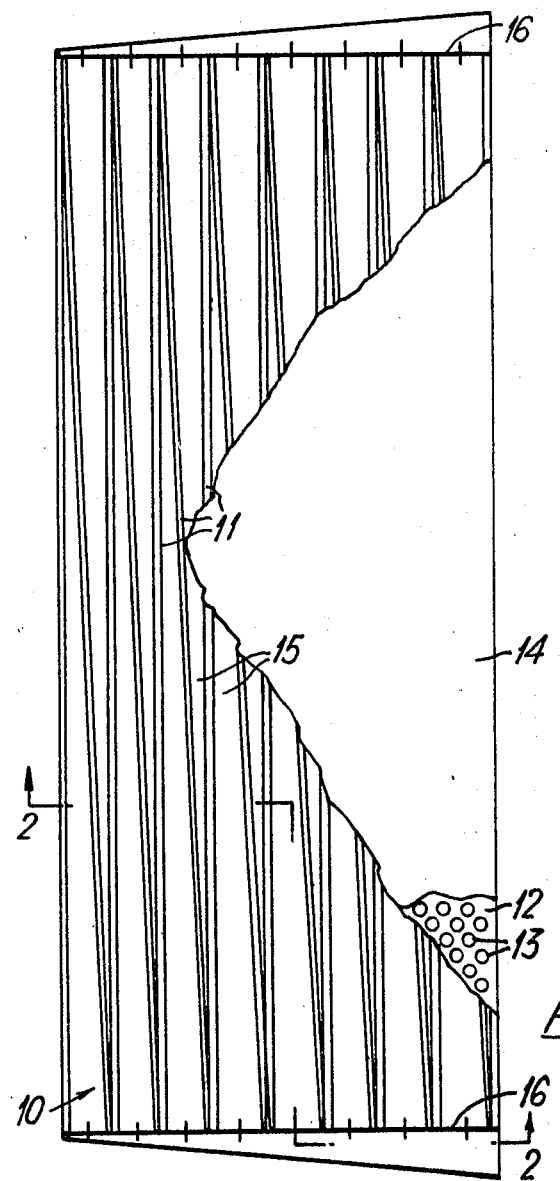
FIG. 1 is a plan of the arrangement, broken away to show the structure.
Figure 2:
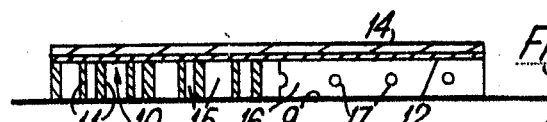
FIG. 2 is a sectional view taken on the line 2-2 of FIG. 1.

In the example illustrated a laminar flow control "glove" 10 is built up externally on a normal wing surface 9 by the use of a support lattice of plastic stringers 11 laid on the wing and covered first with a layer of impervious synthetic plastic 12, perforated with holes 13 to give a 50 percent open area, and then finally with a sheet of porous synthetic plastic 14. This structure is acceptably light in weight and has an acceptably low pressure drop through it, the channels 15 between the stringers 11 forming ducts leading the air away to the suction pumps. A typical thickness for such a structure, from the normal wing surface to the external face of the porous sheet, would be just over an inch. Even sucking over the area of the surface can be promoted by placing stringers 16 across the ends of the main air ducts 15 to stop off these ducts except for metering holes 17 provided in the cross stringers 16.

The preferred material of the outer porous sheet is "Vyon" 1/16 inches thick, which is a sintered high density polythene sheet. The further plastic sheet immediately inside the porous sheet is to improve the stiffness of the "Vyon" in spanning the gaps between the stringers. A suitable material for the stringers is expanded ebonite, e.g. "Onazote". The stringers may be, say, 1½ inches apart. The stringers are bonded to the normal outer skin of the wing, and likewise the inner sheet of plastic may be bonded to the stringers.

To keep the pores of the outer sheet clear the direction of air flow is reversed periodically, say at one hour intervals, to blow, for, say, 30 seconds at 1 p.s.i.

It will be understood that with the structure according to the invention it is possible to change quite readily the particular area of a wing to which laminar flow control is applied. Also the wing need not itself be of a smooth aerofoil shape.

Instead of using stringers and an inner plastic sheet as the supporting means for the outer porous sheet it is possible to build up a support structure which is basically of honeycomb material. However, to keep the pressure drops acceptably low it is necessary to resort to multilayer honeycomb arrangements and the result is heavier and more costly to build up than the structure first described.

We claim:

1. An aircraft lifting surface, adapted for laminar flow control by the addition of a glove assembly comprising an open support framework placed externally on the normal outer skin of said lifting surface, a highly elastic porous synthetic plastics sheet stretched contiguously over said open support framework, and an interlayer of a nonporous but perforated flexible material laid over said open support framework, underneath and contiguous with said highly elastic porous sheet.

2. A lifting surface according to claim 1, further comprising means cyclically sucking and blowing air through said porous sheet.

3. A lifting surface according to claim 1, wherein the support framework comprises stringers laid on the normal outer skin of said lifting surface so as to form air ducts under the porous sheet and interlayer.

4. A lifting surface according to claim 1, wherein the porous sheet is a porous high density polythene sheet.

5. A lifting surface according to claim 1, wherein the interlayer is of an impervious synthetic plastic material.